Nov. 15, 1932.   J. A. YANIZ Y DIAZ   1,887,612
VENTILATING DEVICE FOR VEHICLES
Filed Dec. 18, 1930
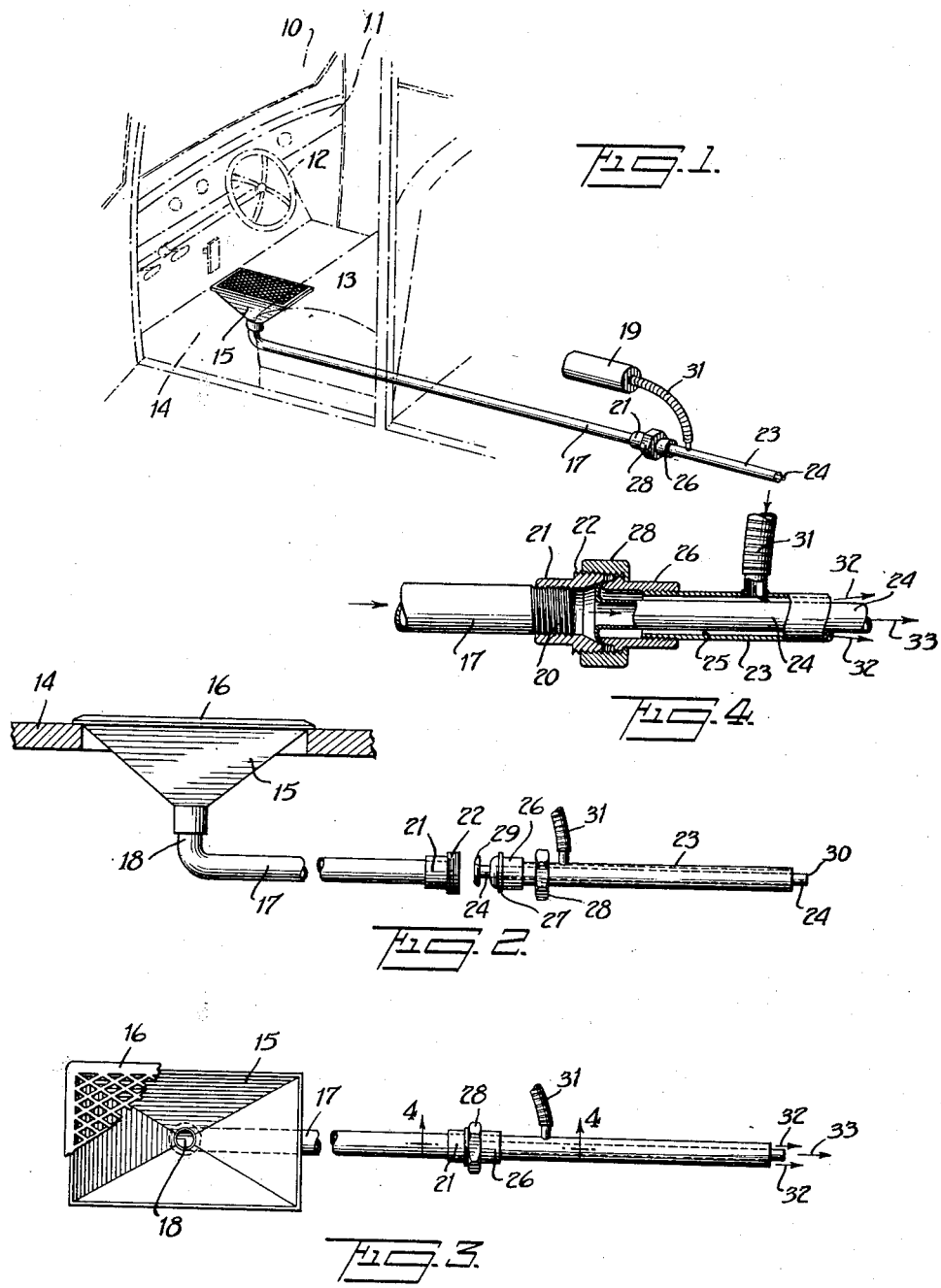
INVENTOR
Jose Agustin Yaniz Y Diaz
BY
Frederick Breitenfeld
ATTORNEY Patented Nov. 15, 1932

1,887,612

UNITED STATES PATENT OFFICE

JOSÉ AGUSTIN YANIZ y DIAZ, OF HABANA, CUBA

VENTILATING DEVICE FOR VEHICLES

Application filed December 18, 1930. Serial No. 503,111.

My present invention relates generally to vehicles, especially motor vehicles, and has particular reference to a ventilating device for relatively enclosed portions of the vehicle.

By way of example, I have herein illustrated and shall hereinafter describe my invention as it is applied to an ordinary automobile, but it will be understood that as to certain phases of my invention it is by no means restricted to this particular type of vehicle.

A general object of my invention is to provide a simple, inexpensive, yet highly efficient ventilating device which will serve automatically to exhaust over-heated or impure or polluted air or gases from those relatively enclosed portions or compartments of the vehicle in which ventilation is desirable. For example, in the specific embodiment herein illustrated, I have shown a device of the present character associated with a motor vehicle for the purpose of cooling and ventilating the space immediately over the floorboard adjacent to the driver.

A more specific object of my invention is to provide a device for accomplishing these general objects in an extremely simple and automatic manner, the device being composed of relatively few and inexpensive parts and being totally devoid of any moving portions or mechanisms.

Another object of my invention is to provide an apparatus which may be readily installed in motor vehicles already on the market, the entire arrangement being in the nature of an attachment which may be independently marketed and the installation of which is relatively inexpensive and simple.

A particular feature of my invention lies in harnessing for the present purpose the characteristics of a chimney or draft flue. More particularly, my device includes a ventilating conduit which extends from the compartment or space to be ventilated to the outside air, and which is so constructed and arranged that an outward draft may be induced therein with a maximum of simplicity and convenience.

A further feature of my invention lies in providing an arrangement whereby the ordinary exhaust discharge of the motor of the vehicle may, if desired, be advantageously adapted as a means for inducing the draft above referred to.

In the preferred embodiment herein illustrated, I have illustrated an arrangement wherein the entire exhaust of the motor is caused to pass through an annular chamber or space surrounding the outlet portion of a ventilating conduit, the parts being so constructed and arranged as to permit the ready application and installation of the apparatus in the simplest possible manner.

I achieve the foregoing objects, and such other objects as may hereinafter appear or be pointed out, in the manner illustratively exemplified in the accompanying drawing, wherein—

Figure 1 is a perspective view of my present ventilating device, showing the same in association with a motor vehicle, portions of which are shown in dot-and-dash lines;

Figure 2 is an enlarged elevational view of the device shown by itself, portions thereof being broken away and other portions being shown in partially separated condition for the sake of clearness and compactness;

Figure 3 is a plan view of Figure 2, the parts being completely assembled; and

Figure 4 is an enlarged longitudinal cross-section taken substantially along the line 4—4 of Figure 3.

In Figure 1, I have illustratively shown my apparatus installed in a motor vehicle for the purpose of ventilating the relatively enclosed compartment immediately behind the motor and at the seat of the driver. Underneath the windshield 10 is the customary instrument board 11, and underneath the latter are control pedals and the like. A steering wheel 12 usually projects upwardly in the manner shown for access by the driver, who sits upon the seat 13. It is well known that the floorboard or boards 14 are subjected to over-heating because of the proximity of the motor, and, as a result of this, the space above this floorboard becomes hot and stuffy, and it is desirable to renew the heated and foul air which collects.

In accordance with my present invention, I provide a chamber 15 in association with the floorboard 14, as shown most clearly in Figure 2, the chamber having downwardly converging side walls and having a grating plate or the like 16 arranged on its upper surface. This grating may advantageously be arranged in a substantially flush relationship with the floorboard 14, and louvers or the like may or may not be provided underneath the grating, to suit differing requirements. The chamber 15 herein illustrated by way of example is constantly in communication, through the grating 16, with the relatively enclosed space or compartment over the floorboard 14.

In the illustrated embodiment, a conduit 17 is arranged lengthwise of the vehicle underneath the latter. The rear end, presently to be described in greater detail, opens to the atmosphere; and the forward end of the conduit communicates with the chamber 15, preferably at the bottom thereof, as indicated by the reference numeral 18.

At 19, I have illustratively shown the rear portion of the exhaust pipe of the vehicle, and I shall now describe the arrangement of parts whereby I have harnessed the capabilities of the gas discharge through this pipe for my present purpose of inducing an outward draft through the conduit 17.

Toward its rear or outlet end, the conduit 17 terminates and is exteriorly threaded, as at 20, a male fitting 21 being associated therewith in the manner shown, this fitting engaging with the threads 20 and being, itself, provided with the exteriorly threaded portion 22.

An outer tube or pipe 23 is arranged in concentric relationship with an inner tube 24, whereby an annular chamber or space 25 is provided around the tube 24. In accordance with my invention, one end of this annular space is closed, and the other end is open, and means are provided for associating these two tubes with the conduit 17 in a removable manner so that the inner tube 24 will serve as a continuation of the conduit 17.

With this general object in view, I have provided the tube 23 at its forward end with a fitting 26, which is preferably in screw-threaded engagement with the tube 23 and which is provided with the collar or flange 27. This fitting forms part of a union which serves as an attaching means for cooperation with the fitting 21. Thus, a loose nut element 28 is mounted around the rear portion of the fitting 26 and is interiorly threaded, so that when the parts are associated in the aligned relationship shown in Figure 4, the nut 28 may be made to engage with the threaded portion 22 to hold the tube 23 and the conduit 17 in alignment. The rear end of the nut 28 is provided with an inwardly disposed collar which engages the collar or flange 27 when the parts are associated.

The inner tube 24 is preferably an entirely independent and separate member, as shown most clearly in Figures 2 and 4. At its forward end, this tube is provided with an outwardly disposed flange 29 which is adapted to engage over the end of the fitting 26 when the parts are assembled. This flange is subsequently clamped between the fittings 26 and 21, in the manner illustrated in Figure 4, and the tube 24 is thus held in proper concentric relationship with the tube 23.

The length of the tube 24 is such that when the parts are associated, its rear or outlet end 30 will project slightly beyond the outlet end of the tube 23.

The outer tube 23 is also provided with a flexible hose or conduit 31 which communicates with the annular space 25 and is adapted to be connected at its free end with the exhaust pipe 19, as shown in Figure 1.

In installing the device, the tube assembly 23—24 constitutes a sort of aspirating device which is independently marketable and capable of attachment to a motor vehicle. The conduit 17 is mounted in any desired position, depending upon requirements, with the chamber 15 or its equivalent communicating with that particular compartment of the vehicle which is to be ventilated. The conduit 17 is preferably provided with a fitting 21 at some convenient point adjacent to the exhaust pipe 19. The inner and outer tubes 24 and 23, together with the attaching means typified by the union 26—28, and together with the hose 31, are then attached to the conduit 17. The tube 31 is then connected with the exhaust pipe 19 in any suitable or desired manner, and the apparatus is thereupon ready for continuous operation.

In operation, the gases discharging through the tube 31 are caused to be blown through the space 25 and out of the rear open end thereof, as indicated by the arrows 32. As these gases sweep past the exposed and projecting end 30 of the inner tube 24, they have an aspirating effect on the latter and induce an outward draft through the tube 24, as indicated by the arrow 33. Since the tube 24 serves as a continuation of the ventilating conduit 17, and may, in fact, be considered an outlet portion of this conduit, of reduced diameter, it is obvious that an outward draft will be induced through the entire conduit 17. This draft continues indefinitely as long as the motor is running, and serves to draw the air from the compartment with which the chamber 15 is in communication, thereby providing the desired ventilating effect.

It is obvious, of course, that only a portion of the exhaust gases may be employed, if desired, although I desire to point out that my present arrangement of tubes and conduits permits of the entire exhaust discharge to be effected through the annular space 25. The space 25 is of sufficient size and capacity to permit all of the exhaust gases to pass through it without imposing any undue or unusual back pressure upon the motor.

I wish to point out further that the arrangement of the inner tube 24 in the projecting manner illustrated is of extreme advantage for the reason that there is no possibility whatsoever of any back draft of exhaust gases through the ventilating conduit 17. In fact, the exhaust gases from the motor never enter the interior of the conduit 17, and serve merely to induce a draft in the conduit 17 by sweeping past the attenuated outlet end 30 of the inner tube 24.

Although I have illustrated the outer tube 23 of substantially the same diameter as that of the body of the ventilating conduit 17, it will be obvious that this particular arrangement is not essential, although I have found it to be preferable from a manufacturing and assembly standpoint, and also from the point of view of providing an apparatus which is neat and uncumbersome in appearance.

I may point out further that where the conduit 17 is arranged longitudinally of the vehicle, as shown, a certain draft effect is produced independently of the exhaust gases, and simply by virtue of the movements of the vehicle. From certain aspects, therefore, my invention resides in the arrangement of the conduit 17, itself, regardless of the means for inducing a draft therein by aspirating methods.

The separate nature of the inner tube 24 is extremely advantageous from a manufacturing standpoint, but it is obvious that my invention is, from its broader aspects, not restricted to this particular construction, nor, in fact, to any of a number of other structural features herein illustrated or referred to.

In general, it will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a motor vehicle having an exhaust pipe, a ventilating device comprising a conduit having an inlet opening in the vehicle compartment to be ventilated, the outlet end of said conduit being nested within the outlet end of said exhaust pipe and projecting slightly beyond the end of the exhaust pipe, whereby the discharge of exhaust gases out of the exhaust pipe will create an outward draft in said conduit.

2. In a motor vehicle having an exhaust pipe, a ventilating conduit communicating at its inlet end with the vehicle compartment to be ventilated, a pair of concentrically arranged tubes having the annular space between them closed at one end and open at the other, the inner tube projecting slightly beyond the outer tube at said open end, means for removably securing said tubes at the closed end thereof to the outlet end of said ventilating conduit so that the inner tube will form a continuation of said conduit, and means for directing gases from said exhaust pipe through said annular space, whereby the discharge of said gases around the projecting end of the inner tube will induce a draft in said inner tube.

3. In a motor vehicle having an exhaust pipe, a ventilating conduit communicating at its inlet end with the vehicle compartment to be ventilated, a pair of concentrically arranged tubes having the annular space between them closed at one end and open at the other, the inner tube projecting slightly beyond the outer tube at said open end, the outer tube being substantially equal in diameter to that of said ventilating conduit, a union for removably attaching said tubes at the closed end thereof to the outlet end of said ventilating conduit so that the inner tube will form a continuation of said conduit, and a flexible conduit directing exhaust gases from said exhaust pipe to the annular space between said tubes, whereby the discharge of said gases out of the open end of said annular space will induce an outward draft in the inner tube and hence in said ventilating conduit.

In witness whereof I have signed this specification this 13th day of December, 1930.

JOSÉ AGUSTIN YANIZ y DIAZ.